United States Patent [19]
Neff

[11] 3,939,802
[45] Feb. 24, 1976

[54] INSECT FEEDING

[76] Inventor: Gregor N. Neff, 85 Myrtle Ave., Dobbs Ferry, N.Y. 10522

[22] Filed: Apr. 12, 1974

[21] Appl. No.: 460,619

Related U.S. Application Data

[63] Continuation-in-part of Ser. No. 213,966, Dec. 30, 1971, abandoned.

[52] U.S. Cl. ............................... 119/51 R; 43/113
[51] Int. Cl.² ........................................... A01K 5/00
[58] Field of Search ......... 43/113, 139; 119/3, 51 R

[56] References Cited
UNITED STATES PATENTS

| | | | |
|---|---|---|---|
| 2,883,790 | 4/1959 | Blackman | 43/113 |
| 3,123,933 | 3/1964 | Roche | 43/139 |

FOREIGN PATENTS OR APPLICATIONS

| | | |
|---|---|---|
| 156,906 | 4/1939 | Germany |
| 392,143 | 11/1965 | Switzerland |

OTHER PUBLICATIONS

Roy C. Heidinger, "Use of Ultraviolet Light to Increase the Availability of Aerial Insects to Caged Bluegill Sunfish" Oct, 1971, pp. 187–192.

*Primary Examiner*—Hugh R. Chamblee
*Attorney, Agent, or Firm*—Curtis, Morris, & Safford

[57] ABSTRACT

A device and method are disclosed for feeding insects to animals. The abundant natural supply of flying insects is used as a food supply. Thus, the insects, which normally are not eaten by humans, are used to grow animals which form a valuable source of protein for humans. In feeding insects to fish, for example, insects are attracted to the surface of the water, preferably at night by means of a light source, and are guided into contact with the water where they can be eaten by the fish. The light not only attracts the insects, but also attracts the fish to the feeding spot. The light source preferably is supported on a floating platform. If needed, several such platforms can be tied together and spread over the surface of a body of water such as a pond or lake to feed the entire fish population in the water. The light source preferably is an electric lamp energized by batteries or by a cable extending from a power supply on the shore. Alternatively, the light source can be a non-electric lamp, such as a kerosene or gasoline lamp.

22 Claims, 17 Drawing Figures

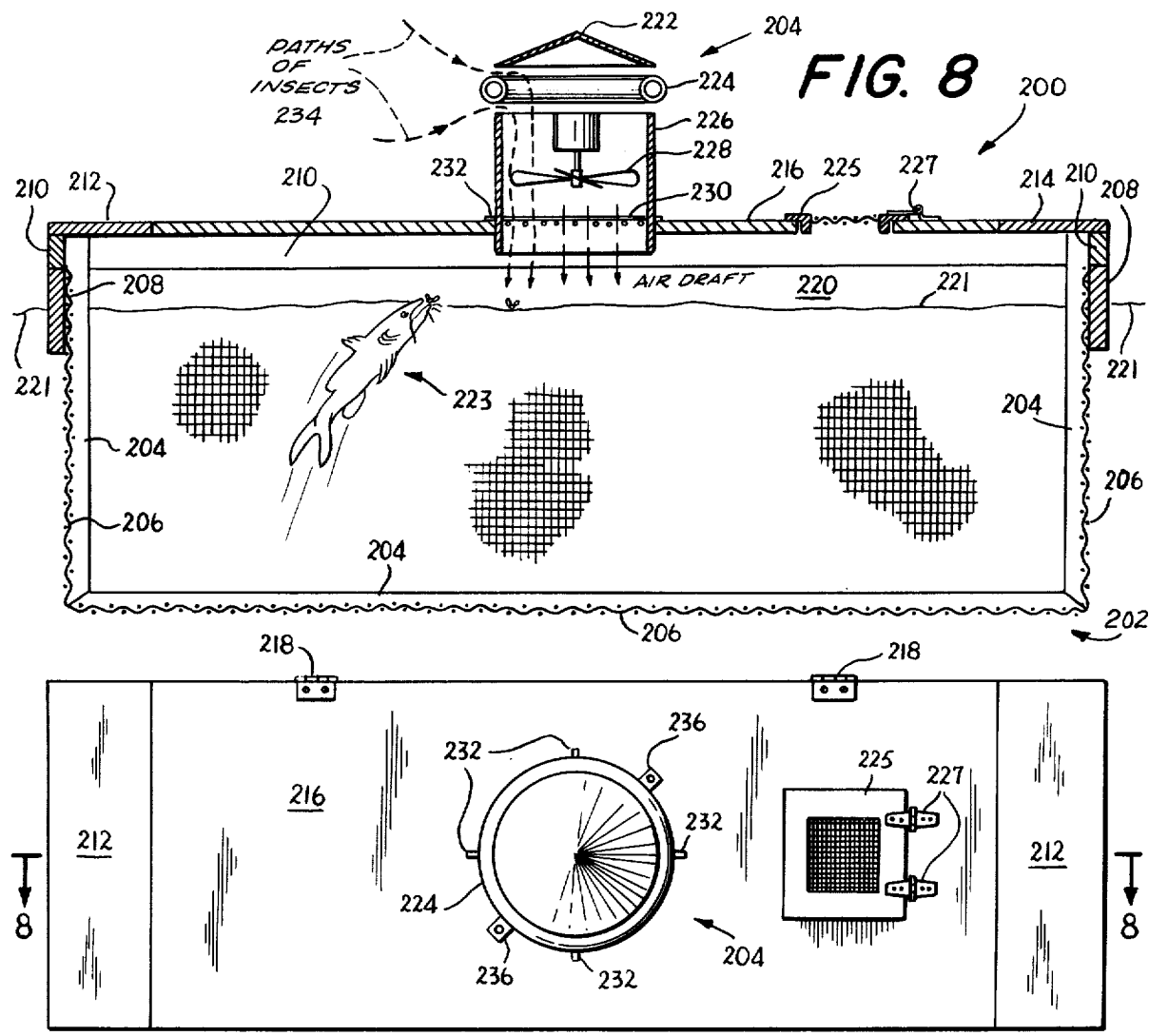
FIG. 8
FIG. 9
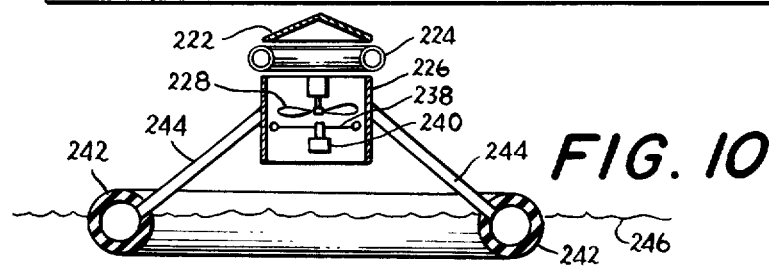
FIG. 10
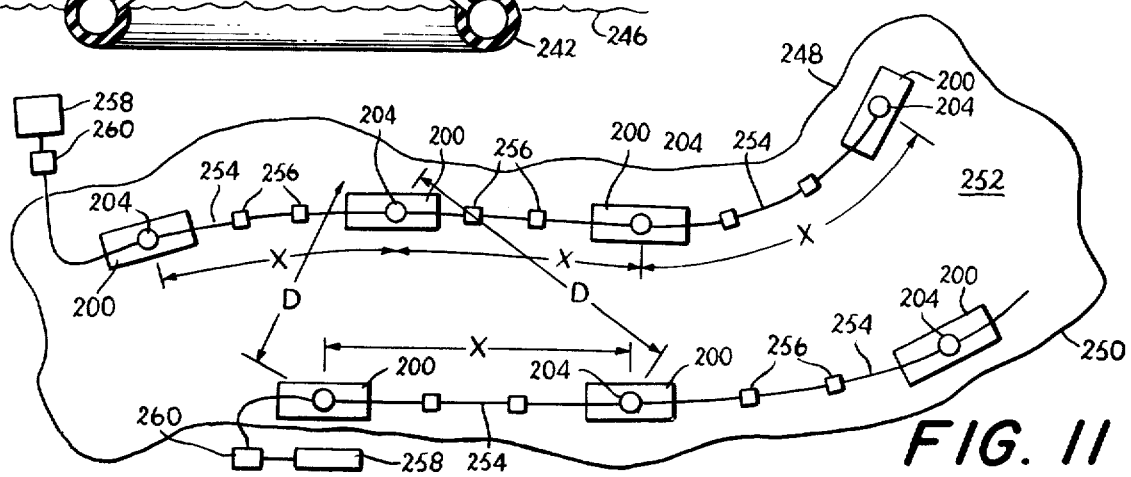
FIG. 11

INSECT FEEDING

This invention relates to means and methods for harvesting and feeding insects to animals, particularly to aquatic animals such as fish. This patent application is a continuation-in-part of U.S. application Ser. No. 213,966, filed Dec. 30, 1971, now abandoned.

The ever-burgeoning human population of the world causes an ever-increasing need for protein to feed the people. Aquatic life offers much promise as a source of this badly needed protein. However, a large part of natural aquatic life grows in oceans, rivers and other large, deep bodies of water. Although such bodies of water once teemed with fish, many now have little to offer fishermen because of heavy fishing and pollution of the waters by the increased populace. Furthermore, the cost of fishing in such waters has increased, along with the cost of preserving and transporting fish from the fishing sites to inland areas, with the result that the cost of fish, especially in inland areas, has increased undesirably.

For the foregoing and other reasons, inland fish farming has become increasingly widespread. For example, there are commercial trout hatcheries and farms in the cooler parts of the world, and catfish farms in the southern part of the United States. Other types of food fish have been raised in various different parts of the world.

To the best of my knowledge, fish raised in hatcheries and fish farms around the world have been fed solid food such as pellets of ground up meat by-products, fish, and other foods eaten by humans, together with whatever natural food happens to be present. The feeding of such solid foods to the fish can be quite attractive in that it permits a relatively large number of fish to be raised in a relatively small volume of water. However, the use of such foods is relatively expensive and is a substantial deterrent to the introduction of fish farming in poverty-stricken and famine-ridden areas of the world. In such areas, the meat by-products, cereals, and other food fed to the fish in the U.S. and other advanced countries would be at such a high premium for human comsumption that feeding it to fish would be virtually out of the question. Furthermore, even in the more advanced countries, the costs of the usual commercial feeds often are so high that the fish raised on the food become too expensive to compete effectively with other protein sources such as beef, pork, lamb and chicken.

Insects have been fed to fish on a rather limited scale for some time. At some fish hatcheries electric lights have been hung above or submerged below the surface of a pond to attract the insects to the pond. Those insects which happen to collide with the water surface are eaten by the fish. See: Doze, J. B., "The Barbed Trout of Kansas", Transactions of the American Fisheries Society, Vol. 55, pp. 175-176 (1925); "Neon Lights Attract Insects to Trout Ponds", Progressive Fish Culturist, Vol. 48, p. 37 (1940); Micheev, V. "Feeding of Fish By the Aid of Light" (In Russia) Ryborod. Ryborod i Ryboloust 3:17-18 (1960). Furthermore, the prior literature describes the experimental feeding of insects to caged fish by the use of ultraviolet lamps with barriers for the insects to hit and fall into the water. See: Heidinger, R. C., "Use of Ultraviolet Light to Increase the Availability of Aerial Insects to Caged Bluegill Sunfish", Progressive Fish Culturist, Vol. 33, No. 4; pp. 187-192 (Oct. 1971); Heidinger, R. C., "Feeding Fish With Light", The American Fish Farmer, Dec. 1971, pp. 12-13.

To the best of applicant's knowledge, the feeding of insects to fish has not been adopted in commercial fish farming operations despite the face that it has been known for many years. One of the reasons for this lack of commercial acceptance, it is believed, is the relatively low efficiency of the prior devices and methods in collecting and feeding insects to the fish. Furthermore, with prior devices and methods, many insects were allowed to escape without being eaten. Additionally, the insects collected by prior methods include many which are too large for small fish such as minnows, fry and yound fingerlings to eat. Thus, the span of fish life during which prior methods were effective has been somewhat limited. An additional problem, it is believed, lies in the maintenance of an adequate supply of insects in the vicinity of the water holding the fish.

The high cost of feed is a problem which is not limited to the fish farming industry. The retail prices of many food animals such as chicken and other fowl prevent many people from buying them, and a major reason for such prices is the cost of feed.

In view of the foregoing problems, it is an object of the present invention to provide a relatively low-cost means and method for feeding both land-based and aquatic animals, but particularly aquatic animals such as fish. It is a further object of the invention to provide a device and method for growing fish for food and/or sport relatively rapidly and easily. It is another object to provide a device and method for fish farming with the use of substantial amounts of natural food for the fish. It is a further object of the invention to provide a means and method for harvesting or catching fish. It is yet another object of the invention to provide insect feeding equipment and methods which are relatively more efficient and are effective for use with smaller fish. It is an object to provide efficient insect collection systems and methods so that it can be economically beneficial to feed insects to land animals.

In accordance with the present invention, the foregoing objects are met by the provision of systems and methods for harvesting insects and feeding them to both landbased and aquatic animals. In feeding aquatic animals, insects are attracted to the surface of a body of water inhabited by the animals (e.g., fish) to be fed, and guiding the insects toward the water surface so that the animals can eat the insects and to prevent the insects from escaping. It is preferred that the insects be attracted at night by means of a source of illumination such as an electric, kerosene or gasoline lamp which floats on the surface of the water. Where electric power is available, it is preferred that a fan be used to create air drafts to force the insects against the surface of the water for maximum rate of capture by the fish. There also is provided an insect trap which holds the insects close to the water over a relatively wide-spread area to ensure eventual capture by fish. The source of illumination is so structured that it attracts not only the insects to the water, but also attracts the fish to the insects. Alternative means and methods for preventing the escape of insects before being eaten include killing or stunning the insects. Also provided is a device and method of comminuting the insects to provide small insect bits to feed to small fish and other animals. Cages for the cage culture of fish and frogs are provided in which the cage structure is used both to retain the fish or frogs and to hold insects. A method of using cages for the cage culture of fish is described in which the cages are spaced apart from one another far enough so that they do not interfere with one another in their insect-catching abilities. They are aligned along the shore of a body of water such as a lake, river, canal or pond so that they attract terrestrial as well as aquatic insects. When the insects in one area become scarce, the cages are towed to new locations, and then returned when the insects in the original area have replenished themselves. Insect harvesting systems using plural insect traps and conduits connecting the traps together in series and parallel networks also are provided. The feeding of insects to land animals such as chickens and other fowl, as well as cattle, hogs, etc. is another feature of the invention.

The foregoing and other objects and advantages of the invention will be described in or apparent from the following description and drawings.

Figure 4:
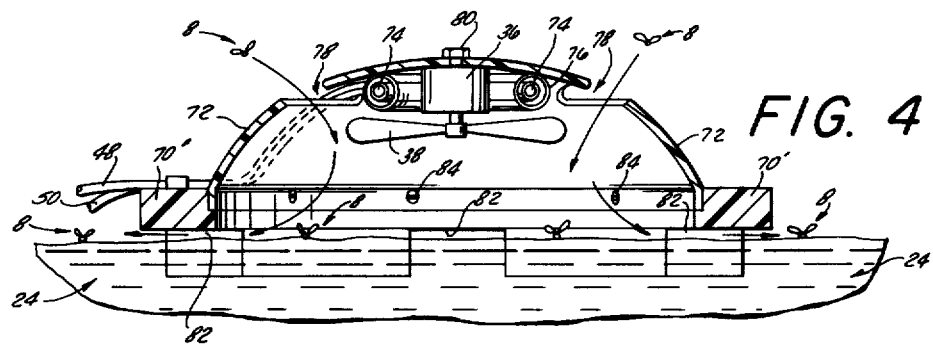
Figure 5:
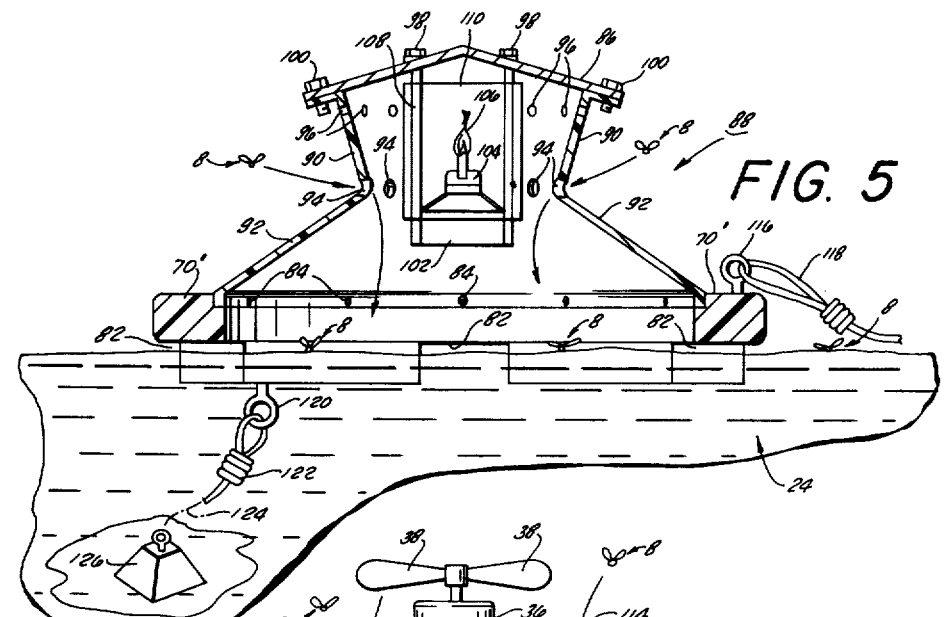
Figure 6:
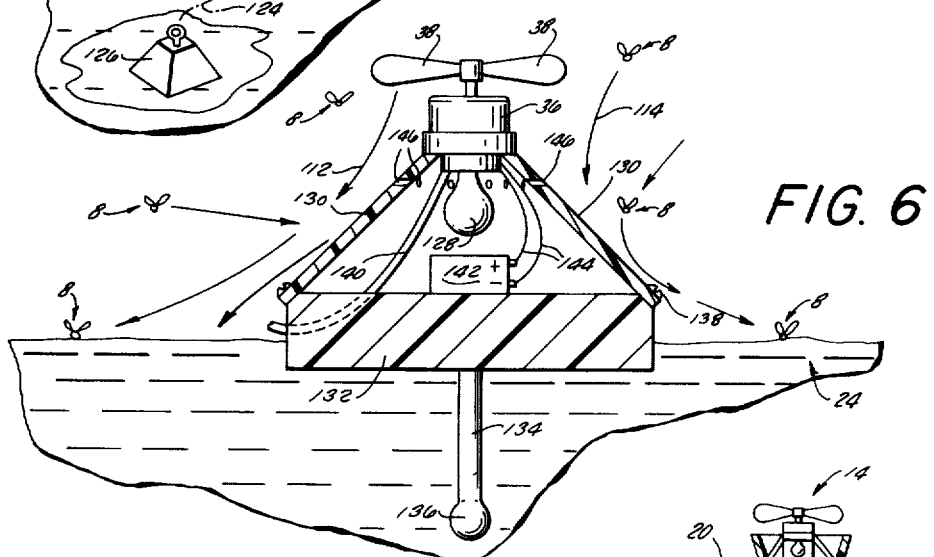
Figure 7:
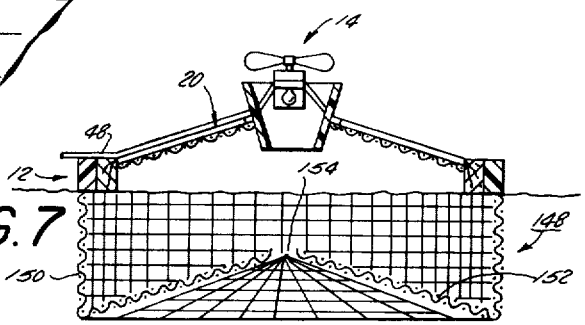
Figure 12:
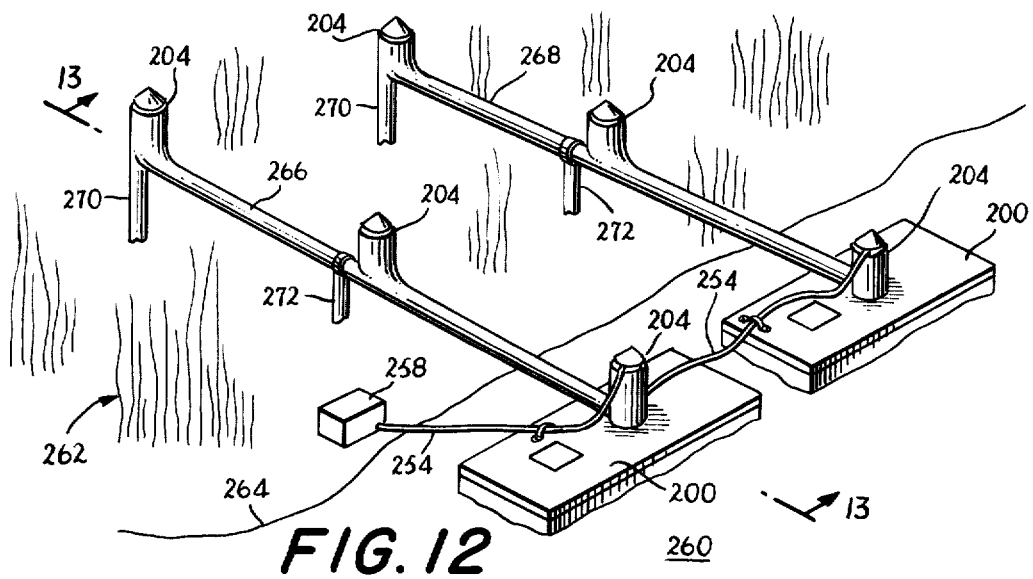
Figure 13:
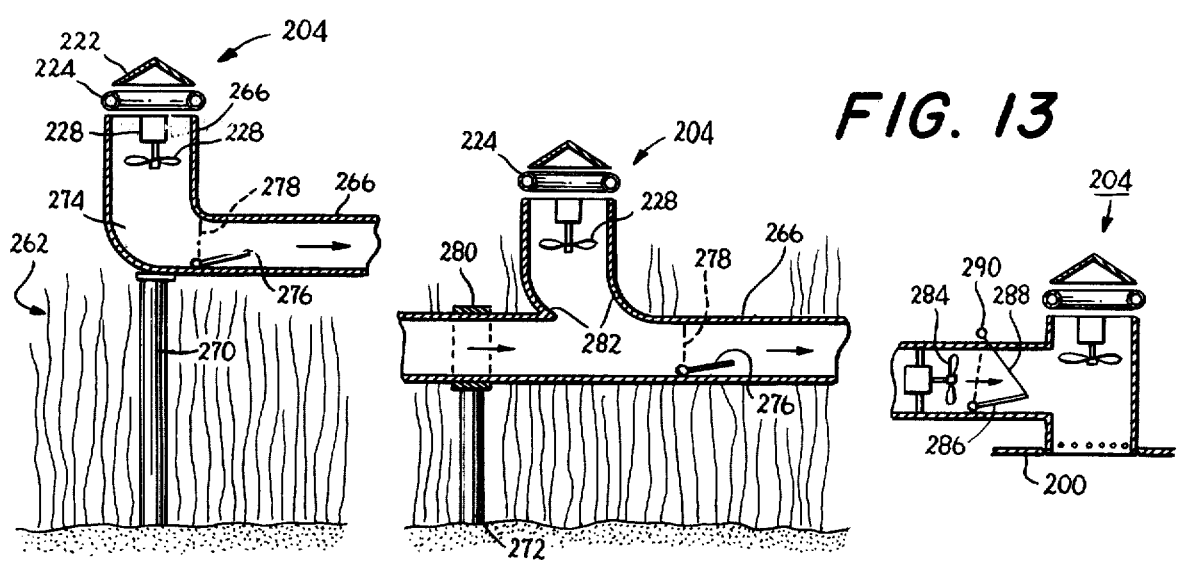
Figure 14:
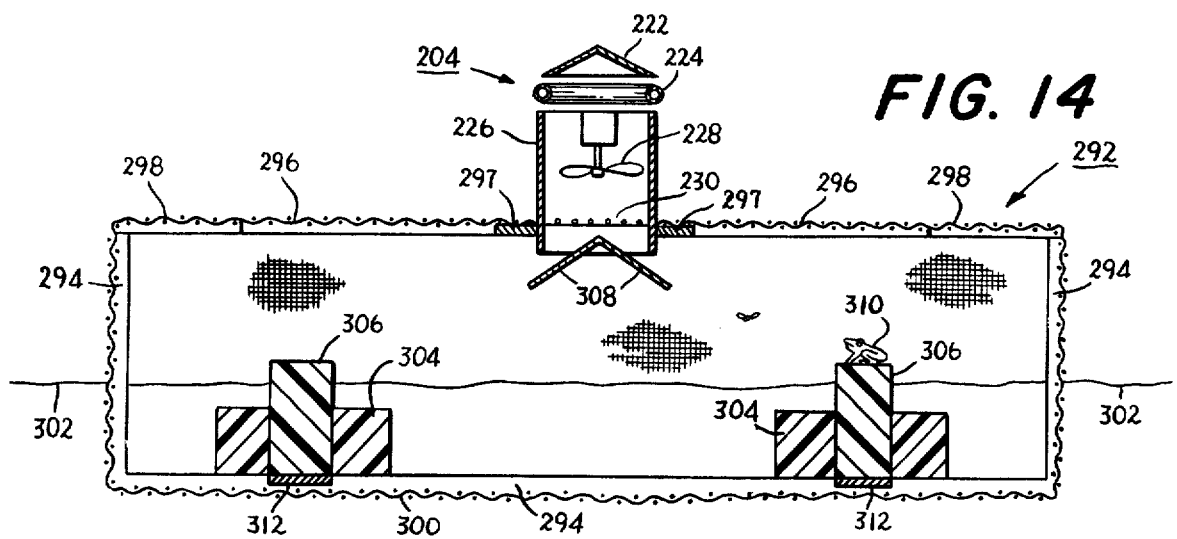
Figure 15:
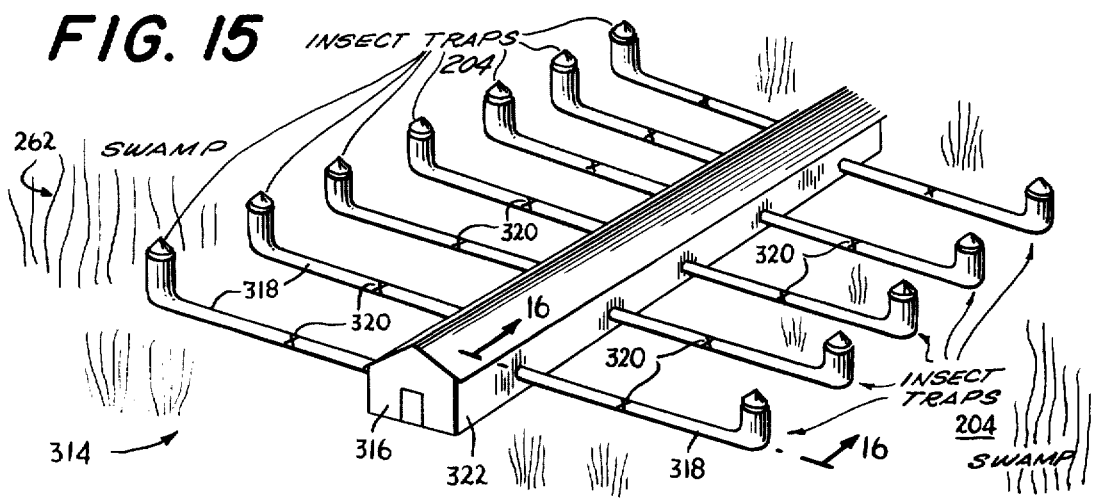
Figure 16:
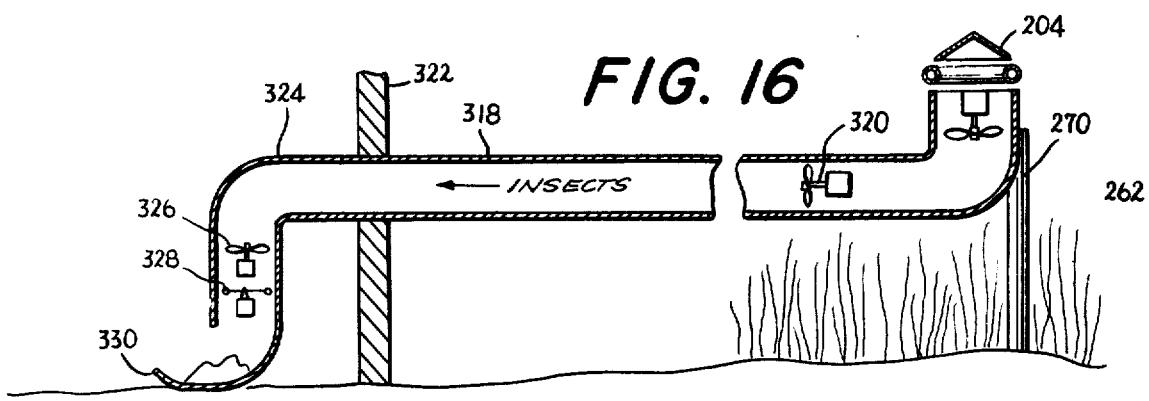
Figure 17:
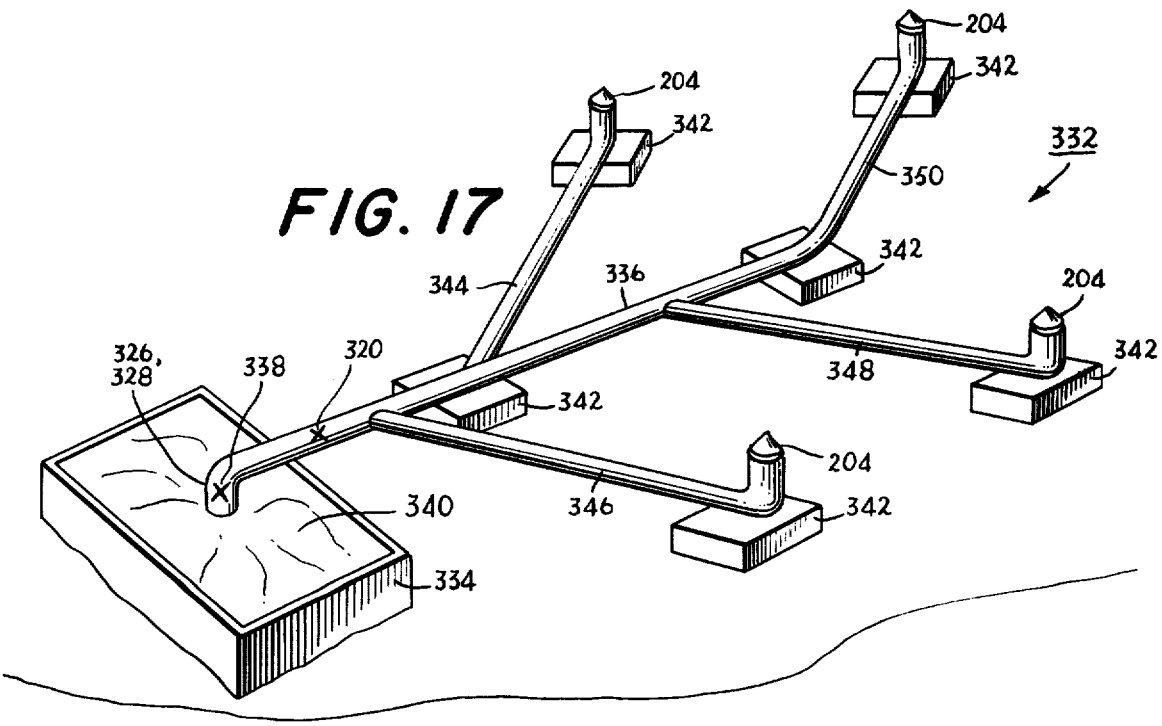

Each of FIGS. 4, 5 and 6 comprises a separate embodiment of the fish feeding device of the present invention;

FIG. 7 is a schematic and cross-sectional view illustrating a fish harvesting device and method of the present invention;

FIG. 8 is a cross-sectional elevation view of another embodiment of the invention;

FIG. 9 is a plan view of the device shown in FIG. 8;

FIG. 10 is a cross-sectional view of another embodiment of the invention;

FIG. 11 is a schematic view of a cage culture system utilizing the invention;

FIG. 12 is a perspective view of an insect collecting and fish feeding system of the present invention;

FIG. 13 is a fragmented cross-sectional view taken along line 13—13 of FIG. 12;

FIG. 14 is a cross-sectional, partially schematic view of an embodiment of the invention useful for the culture of frogs;

FIG. 15 is a perspective view of an insect gathering system in use in delivering insects to feed animals in an elongated rearing enclosure;

FIG. 16 is a fragmented cross-sectional view taken along line 16—16 of FIG. 15; and FIG. 17 is a perspective schematic view of a parallel-form insect collection system of the invention.

PREFERRED FEEDING DEVICE

Figure 1:
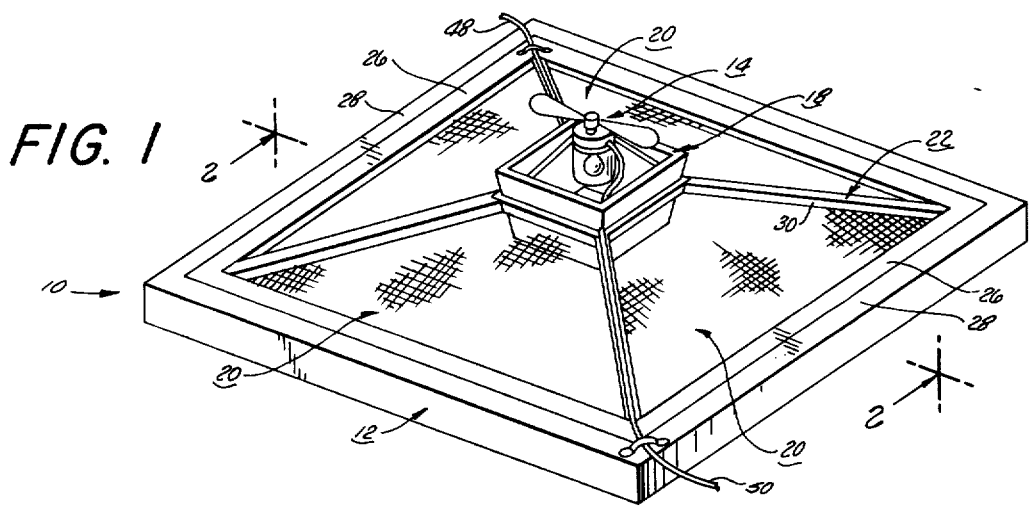
FIG. 1 is a perspective view of a fish feeding device constructed in accordance with the present invention.
Figure 2:
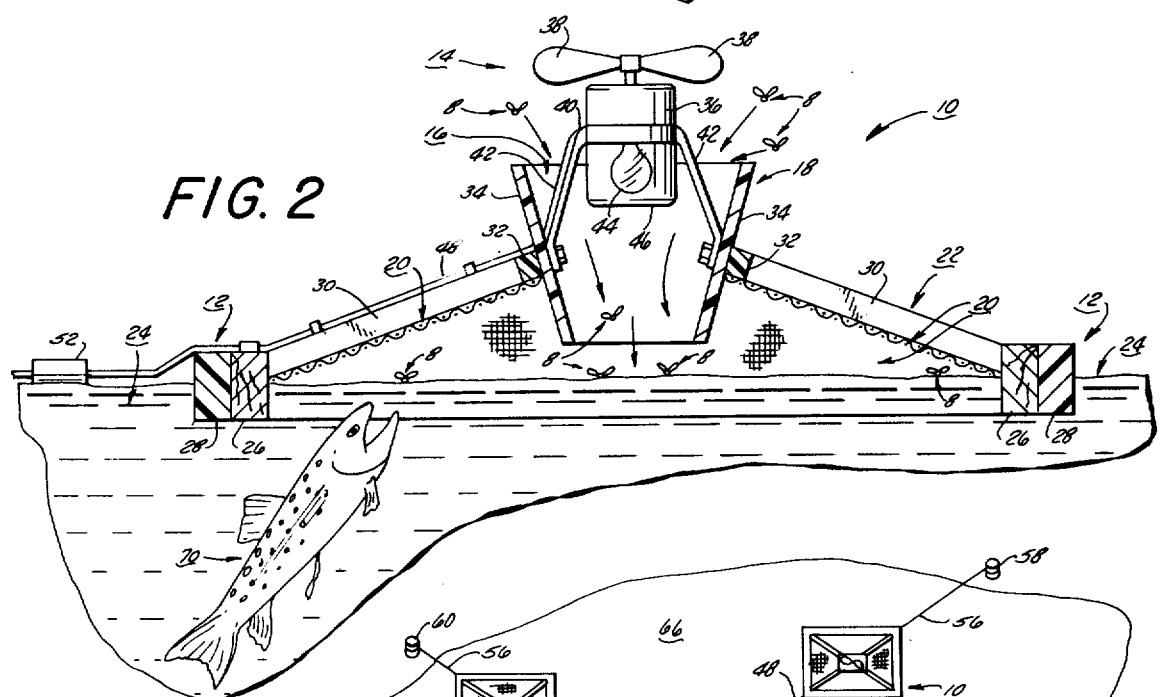
FIG. 2 is a cross-sectional view taken along line 2—2 of FIG. 1.

The fish feeding device 10 shown in FIGS. 1 and 2 includes a float and cage unit 12, with an attractor assembly 14 mounted over a central hole 16 in the center of the unit 12. The inlet opening 16 is defined by a funnel-shaped guide structure 18 with four flat walls 34 preferably made of a transparent material such as Lucite.

The attractor assembly 14 includes a fan having an electrical drive motor 36 and a pair of blades 38. The assembly 14 also includes a lamp having an electric light bulb 44 and a socket for the light bulb, together with a glass cover 46. The lamp is of the outdoor variety in which the cover 46 protects the bulb 44 from rain, snow and other natural elements.

The float and cage unit 12 includes four side members 26, preferably of a buoyant material such as wood, and four elongated blocks 28 of buoyant material secured to the outside surfaces of the members 26. The side members 26 are joined together to form an approximately square-shaped base. The float members 28 are attached to the side members 26 to give the unit greater buoyancy than that provided by the wood. The unit 12 also has four spokes, preferably made of a buoyant material such as wood, and four support members 32 to which the guide structure 18 and the attractor assembly 14 are secured. The spokes 30 are secured at their lower ends to the members 28 at the corners of the base. The spokes 30 are inclined upwardly so that their inner ends are considerably higher than their outer ends, as is shown in FIG. 2. Relatively fine-mesh screen 20, such as aluminum household screen, is secured to the under-surfaces of the spokes 30 and members 32, and to the members 26 so as to form a cage to hold insects close to the surface of the water 24 upon which the unit 12 floats.

Figure 3:
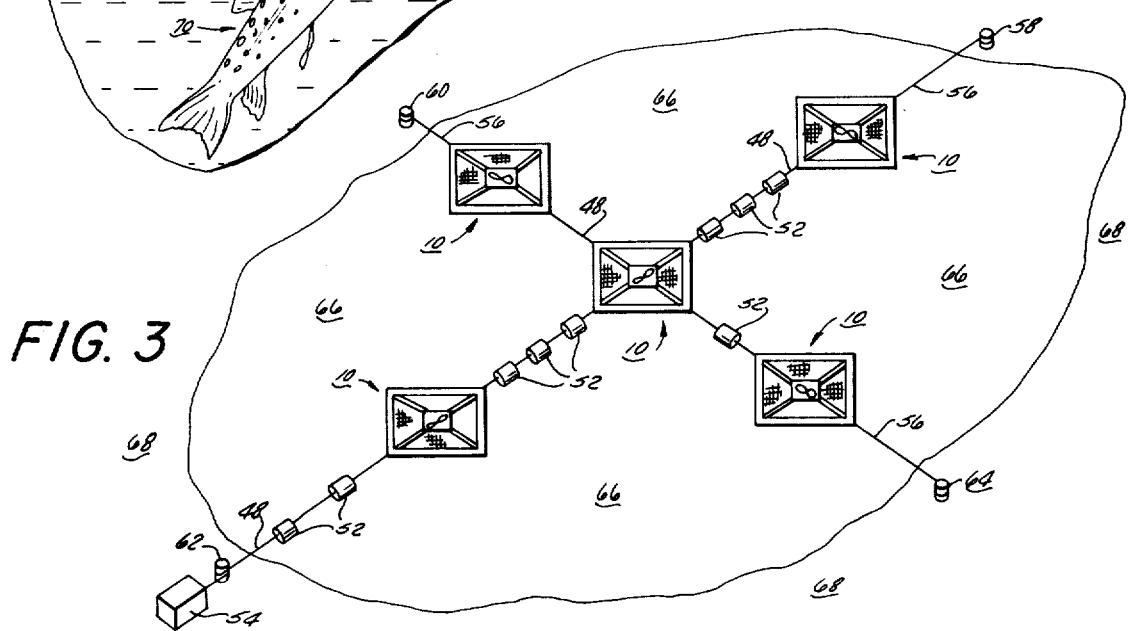
FIG. 3 is a schematic perspective view of a fish feeding system constructed in accordance with the present invention.

An electrical cable 48 conducts electrical energy to the fan motor 36 and the bulb 44. Another cable 50, which is connected to a spoke 30 opposite the one to which cable 48 is attached, extends from the other corner of the unit 12 to transmit power to a subsequent fish feeding unit 10 which may be connected to it as shown in FIG. 3.

The fan motor 36 and the lamp are secured together by means of a clamp 42 to which four legs 42 are secured. Only two of the legs 42 are shown in FIG. 2, for the sake of clarity in the drawings. The legs 42 are secured inside of the guide 18 by means of bolts or screws, as is shown in FIG. 2, and thus support the fan and lamp on the floating base.

METHOD OF OPERATION

FIG. 2 shows the fish feeding device 10 in use, floating on the surface of the water 24. The buoyancy of the parts 26 and 28 maintains the bottom edge of the funnel structure 18 just above the surface of the water. Preferably, the device 10 is operated at night. The glowing lamp attracts flying insects 8 to it. When the flying insects come near the lamp, the draft of air created by the spinning fan blades 38 blows the insects downwardly through the funnel-shaped guide 18 into the cage formed by the screening 20.

Most of the insects 8 will float on the water. The lamp shines into the water, thus attracting fish such as the trout 70 to the area. The walls 34 of the guide 18 preferably are transparent so as to permit more light to reach the water than would be the case if the walls were made of an opaque material. The rising fish then eat the insects 8 resting on the surface of the water. If any of the insects leaves the water before being eaten, its escape will be prevented by the screening 20 and the air draft flowing through the guide 18. Inevitably, the insects will collide with or fall back into the water, eventually to be eaten by the fish.

Some of the insects 8 may sink instead of floating on the water. Most of those insects will be eaten too.

The relatively wide expanse of the base of the device 10 spreads the floating insects over a relatively great surface area so as to permit a maximum number of fish to feed at the same time.

The glass shield 46 not only protects the bulb 44 from rain and other natural elements, but it also protects the bulb from any water which might be splashed upwardly by the feeding fish.

TYPICAL INSTALLATION

FIG. 3 shows the invention in use on a typical trout pond 66 of one to five acres or less in size. A total of five feeding units 10 are shown in use. The number of devices 10 used will vary with the size of each unit, the fish population and size, the insect supply available, etc. Power is supplied from a motor-generator set 54 or other electrical power source through the cable 48 to each of the units 10. The cable 48 also forms the connecting link between the units, except for the lines 56 which are beyond the portion of the system requiring electrical power. The lines 56 are simply ropes which are used to tether the system and hold it in place.

The cable 48, of course, is of a variety which is impervious to water, and has a series of floats 52 to keep if floating on the water so that it will not sag and will hold the floating devices 10 firmly in place. Four posts or trees 58, 60, 62, and 64 are provided on shore and lines 56 and 48 are secured to the posts as shown. This holds the system stationary and keeps it from drifting too much with the wind.

If it is not desired to keep the devices 10 in place during the daytime, it is a simple matter to loosen the ropes 56 and walk around the shore, pulling the floating units to one side of the pond 66 where they will be out of the way. However, since the lamp, the cables 48 and 50, the fan, the motor 36 and the electrical connections are of a type which is impervious to rain and other natural elements, the devices 10 can be left floating in the water during the entire growing season.

In accordance with one aspect of the present invention, the color of the light emitted by the bulb 44 can be varied in order to attract the largest number of insects and most desired varieties of insects. For example, an ordinary white light bulb can be used, and the results compared with those obtained by the use of a yellow, green, blue, etc. lamp, until the best color is found. Lamps specially adapted to attract insects into insect traps can be used. The colors of the light also can be changed in accordance with changes in the makeup of the insect population at various times of the year.

In using multiple fish feeders 10 as shown in FIG. 3, a broader range of light colors can be used, thus attracting a broader range of insects, by the use of a different colored lamp in each of the units. Thus, insects of predominately one type might be attracted to one of the units 10, while insects of another type might be attracted to another of the units.

The material used for the floats 28 can vary widely; it can be any of the naturally-buoyant materials such as balsa or similar woods, cork, hollow reeds, encased kapok, etc. The float material also can be any of the synthetic foam materials of the closed cell variety; e.g. polystyrene foam, polyvinyl clhloride (PVC) foam, polyolefin (polyethylene or polypropylene) foam, etc. Such foams are widely used to form floats for rafts, piers and other aquatic structures. The floats also can be made of air-tight hollow bodies made of metal, plastic, or other sheet material.

The wooden components of the feeding device should be painted or otherwise treated to keep them from rotting or becoming water-soaked. Alternatively, rust-free light-weight aluminum or plastic tubing can be used in place of the wooden members.

The screening 20 also should be rust-free. In addition to aluminum screening, fine mesh netting of nylon or other fibers can be used.

The form of the invention shown in FIGS. 1 and 2 is preferred primarily because it can be built by hand in small quantities at a reasonably cost, without the need for complicated tools or machines. In quantity production, it is believed that it would be preferable to give the base a ring shape and fabricate it as an integral part, much in the manner of the embodiments to be described below.

ADVANTAGES: DAY-NIGHT FEEDING METHOD

One major advantage of the fish feeding device 10 is that it uses as food insects which are free for the taking. In fact, the insects usually are considered to be pests, and the use of the invention may well significantly reduce the annoyance to man created by the pests. Furthermore, it is preferred that the feeding of insects take place at night. The fish also can be fed solid food in the daytime, by conventional methods such as spreading pellets in the water. Thus, the fish can be fed both at night and in the daytime to increase their growth rate. Alternatively, if the insect supply in the vicinity is adequate, the insects can be the sole food fed to the fish. In the latter case, it is believed that feeding and growing the fish can be made very inexpensive, hopefully bringing the art of fish farming within the means of even the poorest and hungriest people.

ENCLOSED FEEDER

FIG. 4 shows another embodiment of the fish feeding device of the present invention. This embodiment, as well as that described above, involves the use of an insect trap floating on the water. Parts which are the same in this embodiment as in that shown in FIGS. 1 and 2 are given the same reference numerals.

The fan motor 36 and its blades 38 are mounted inside of a transparent (preferably Lucite) housing 72 of approximately hemispherical shape. The motor 36 is secured in place by means of a nut 80 on a bolt extending through a hole in the upper surface of the housing 72. A ring-shaped neon or fluorescent lamp 74 is mounted inside the canopy in a position in which it surrounds the motor 36. A transparent plastic shield 76 encloses the lamp 74 so as to protect it from the splashing or water by the fish. The lamp and the fan thus are enclosed in the housing 72 and protected from the elements by it.

Several horizontal slots 78 are cut in the housing 72 adjacent the lamp 74 so as to permit insects to enter the housing. The lower edge of the housing 72 is secured by means of screws 84 to a ring-shaped float member 70' which may be made out of the same buoyant material as that used to make the floats 28 shown in FIGS. 1 and 2. Preferably, a plurality of slots 82 are cut in the lower surface of the float 70'. The slots 82 are dimensioned so that their upper wall normally is just slightly above the surface of the water when the unit is floating.

In this embodiment, when the insects 8 fly into the housing 72 through the slots 78 towards the lamp 74, the fan creates a down-draft of air which prevents the insects from again leaving through the slots 78, and forces them down towards the surface of the water.

The device shown in FIG. 4 covers relatively less surface area of the water than does the device shown in FIG. 2. Therefore, means are provided for spreading the insects outside of the housing. The air draft created by the fan flows out of the enclosure through the slots 82 and carries floating insects with it. The floating insects then can be eaten by additional fish which cannot reach the area directly beneath the interior of housing 72.

NON-ELECTRICAL FEEDER

FIG. 5 shows an embodiment of the invention which does not require electric power. Instead, it uses a kerosene or gasoline lamp to attract the insects. This can be very desirable in remote areas where there is no inexpensive source of electric power, and in areas in which the people cannot afford to use electrical power, fans and lights.

The device 88 shown in FIG. 5 includes a kerosene lamp consisting of a fuel tank 102, a burner 104 and a flame 106, together with a glass chimney 110. Two rods 98 are secured to the chimney 110 and tank 102 and are fastened to a conically-shaped metallic roof 86 by means of a pair of fasteners such as nuts 98. The roof 86 is fastened by means of screws 100 to a housing having a cross-section which looks generally like the letter "V" lying on its side. The housing is formed by a pair of walls 90 and 92 with a series of holes 94 at the junction of the walls. The holes are large enough to permit the largest expected insects to enter. Other smaller holes 96 appear at the top of the housing to let excess heat from the lamp escape.

The housing is secured along its lower edge by means of screws 84 to float 70' which is identical to float 70' shown in FIG. 4.

In use at night, the lamp flame attracts insects into the housing. The sloping walls 92 and 94 of the housing guide the insects toward the holes 94, through which they enter.

Since there is no fan with which to force the insects down towards the water 24, other means are provided. This means is the heat generated by the flame of the lamp. The heat is deliberately allowed to rise to such a level that the insects are stunned or killed and fall to the surface of the water below. Of course, some of the insects will fall or fly into the water by chance. The insects can be eaten by the fish while in the enclosure formed by the device, or else the insects can float out through the slots 82. Although there is no air flowing through the slots 82 to force the insects out, the insects 8 can be spread over a greater surface area by allowing the device 88 to float at the end of a relatively loose anchor rope. The anchor rope 122 is secured to an eyebolt 120 fastened to the under-surface of the float 70', and is attached at its other end to an anchor 126 resting on the bottom of the body of water. The dashed portion 124 of the rope 122 indicates that the anchor 126 actually is not as close to the unit 88 on the surface of the water as it would appear from FIG. 5. The water depth, however, has been foreshortened for the sake of compactness in the drawings.

If desired, the device 88 also can be maintained relatively stationary by means of tether ropes such as the rope 118 fastened to another eye-bolt 116 on the float 70.

NON-TRAPPING FEEDER

Each of the devices shown in FIGS. 1–5 includes an insect trap for trapping the insects on or near the water surface, and at least temporarily holding the insects in the enclosure.

The embodiment shown in FIG. 6 has no insect trap. Instead, the fan motor 36 and its blade 38 and an electrical lamp 128 are mounted on a frustro-conical Lucite housing 130 secured to a foam float member 132 by means of screws 138. A light bulb 128 is mounted inside the housing 130, and the fan is mounted outside the housing 130. Downwardly-slanting holes 146 are provided to allow some of the heat of the light bulb to leave the enclosure. The motor 36 and the bulb 128 are energized by means of electrical current delivered through a cable 140, or from a battery 142 mounted in the housing 130.

A keel 134 with a weighted lower end 136 is provided in order to minimize the chances of the device tipping over in the water. The lamp 128, with its light shining through the transparent walls of the housing 130, attracts the flying insects at night. When the insects approach the housing 130, they are caught in a downdraft 112 or 114 of air which forces the insects towards the sloping sides of the housing 130. They are then forced downwardly towards the water and away from the floating fish feeding unit. Thus, the device shown in FIG. 6 spreads the insects over the water after forcing them into the water. However, they are free to leave the water surface if they can escape before being eaten by fish.

The unit shown in FIG. 6 has the advantage that it can be made smaller and, perhaps more cheaply than some of the other embodiments of the invention. Although many of the insects that it catches may escape and not be eaten by the fish, this may not be objectionable if the insect population is large enough so that the fish feed adequately regardless of the number of insects which escape. Furthermore, since the insect population in the vicinity of a lake is converted by the invention into a food source for the fish, since some of the trapped insects may not be eaten, it may be desirable to allow a number of the insects to escape and multiply rather than simply drowning them in one of the trap embodiments. In this manner, a now-valuable natural resource; i.e. the insects, is conserved.

The devices shown in FIGS. 4, 5 and 6 can be arranged as shown in FIG. 3, and modified in other ways in the manner described above in connection with FIG. 2.

The feeding devices need not float on the water. Instead, they can be mounted on posts driven into the bottom of the body of water, with the upper ends protruding just above the water, or they can be hung from tree branches, docks, or other structures near or above the water. However, it is believed that the floating of the devices is the best mode of supporting them.

FISH HARVESTING

The invention can be used to assist in harvesting the fish fed by the invention, as well as in feeding the fish. FIG. 7 illustrates a device which is adapted for this purpose. The device shown in FIG. 7 is identical to that shown in FIGS. 1 and 2, except that a wire mesh fish trap 148 hangs downwardly from the bottom of the floating base of the unit 10. The trap has vertical sidewalls 150, and a frustro-conical bottom 152 with a small inlet opening 154. The fish are attracted into the trap 148 to feed on the insects and find it difficult to escape. The unit 10 then simply is pulled onto the shore for removal of the fish.

Baited hooks and gill nets suspended from the unit 10 also can be used to catch the fish.

If the locale of the body of water in which the fish are raised does not have a large enough natural insect population, desirable insects can be raised in nearby swampy areas or ponds designed specifically for the breeding of the insects.

CAGE CULTURE

The harvesting of fish using the device shown in FIG. 7 of the drawings is a special type of cage culture of fish, in that the fish first are lured into the fish cage or trap 148 and then are fed insects. However, for the intensive, long-term culture of fish in cages, the embodiment of the invention which is shown in FIGS. 8 and 9 is preferred.

The fish feeding device 200 shown in FIGS. 8 and 9 includes a conventional cage 202 floating on the surface 221 of a body of water. The cage contains a substantial number of fish such as the channel catfish 223 (*ictalurus punctatus*). The cage 202 includes frame members 204 fastened together to form a rectangular parallelepiped, and wire mesh 206 secured to the frame members. Four slabs 208 of styrofoam or other flotation material extend completely around the cage near its top, and abutt against a frame member 210.

The cage 202 has a solid top including plywood side portions 212 and 214, and a central hatch cover 216 secured to the frame members 210 by means of hinges 218.

Mounted in a circular hole in the cover 216 is an insect trap 204. The trap 204 is quite similar to the trap shown in FIG. 4. It includes an electric "blacklight" bulb 224, a roof 222, a cowling 226, and an electric fan 228 within the cowling. The bulb 224 is close to the upper edge of the cowling and the lower edge of the roof, so that air drafts are created by the fan to draw insects into the trap through the annular gaps between the bulb 224 and the cowling and roof. Paths of insects drawn into the traps in this manner are shown at 234 in FIG. 8. In this manner insects are attracted and drawn into the air space 220 between the top of the cage and the surface of the water, and into the water where they can be eaten by the fish in the cage. Details of construction, such as the electric cord and the support members which hold the components of the trap 204 together have been omitted from the drawings for the sake of clarity.

A grille 230 is mounted at the lower end of the cowling by means of ends 232 of the grille wires which extend through holes in the wall of the cowling. These grille wire ends 232 rest on the edge of the hole in the cover 216 to support the insect trap on the cover. As it is shown in FIG. 9, L-shaped brackets 236 are used to fasten the cowling to the cover 216. The size of the mesh of the grille 230 is large enough to let insects through, but small enough to protect the fish from contact with the fan blades and to keep large predators out of the cage.

A small screen-covered door 225 is mounted on hinges 227 over a rectangular hole in the cover 216. The screened door 225 permits observation of the fish while they are feeding without allowing insects to escape, and provides an access hole through which pelletized commercial fish foods and supplements can be fed to the fish.

The flat slab 208 of flotation material not only floats the cage on the water surface, but it also keeps insects from escaping from the enclosure 220.

The feeding cage device 200 shown in FIGS. 8 and 9 is especially desirable because its major components are readily available. The case 202 is manufactured and sold by the C. E. Shepherd Co., Houston, Texas. The insect traps 204 are sold by Atlantic Research Labs Corp., Long Island City, New York. Thus, fabrication of the feeders 200 requires little or no expensive manufacturing equipment. The bulb 224 is a ring-shaped "blacklight" (ultraviolet) bulb sold by the General Electric Company.

FIG. 11 of the drawings shows a preferred method of using the feeders 200 in the cage culture of fish.

Strings of feeders 200 are aligned along the shores 248 and 250 of a relatively large, elongated body of water such as a canal or river. Alternatively, the body of water can be a lake or large pond. The feeders 200 are spaced from one another by a distance X which is great enough to prevent the lights of the insect traps from interfering with the catching abilities of one another. For example, a distance of X of around 50 feet might be suitable for this purpose. The feeders 200 are connected together by cables 254, preferably the same cable as that used to carry electrical energy to the insect traps, which float on the water by means of floats 256. The cables are reinforced and anchored to the cages so as to permit towing of the entire string of feeders without breaking the cables.

The insect traps are energized from a shore-bound motor-generator 258 and a timer 260 which is used to automatically turn the insect traps on and off at the times desired. Of course, if utility-supplied electric power is available, unit 258 then is simply a receptacle into which the cable terminal is connected.

The feeders 200 are lined along both shores 248 and 250 of the body of water 252, with the units 200 on one shore being staggered with respect to those on the other shore so as to maintain a minimum distance D sufficient to prevent interference with feeders on the other shore. The feeders are located as close to the shore as the water depth will permit so that as many terrestrial insects as possible will be attracted to the feeders. Also, if the body of water 252 is a river, the water currents will be slowest near the shores.

In accordance with one feature of the invention, the fish which are being grown are kept caged (as opposed to being allowed to roam freely in a pond), and the strings of cages are towed to a new location when the insect population becomes depleted in a given area. After the insect population becomes depleted in the new area, the strings of feeders 200 can be towed to still another new location, or they can be returned to the original area where the insects by then have replenished themselves.

An important advantage of the use of the invention in cage culture in the manner described above is that it makes good use of the vase areas of swampy, insect-infested, presently useless land for growing food. For example, many acres of canals and lakes in the Florida Everglades have abundant water and insects, but are presently unused. The abundance of insects, usually considered a detriment, becomes an asset because of the present invention. These waters can be used to raise catfish and other warm-water species at a lower cost, it is believed, than if the fish were raised in ponds on level land usable for growing row crops (e.g., corn, cotton, soybeans, rice, etc.) and being fed standard commercial feeds. One reason for this, it is believed, is that the food and feeding cost less, and another is that the swamp land usually costs much less to buy and pay taxes on than fertile crop land. Thus, the total food output within a given country can be increased by shifting fish production to the unused swamp land, and using fertile crop land for growing row crops or feeding land animals.

The feeding of insects to fish in the cages is much easier than the feeding of standard food pellets. Instead of boating out to the cages and depositing feed in them one-by-one, all that need be done is to flick an electrical switch. Even this can be eliminated by the use of timers. The timers can be of the type which operate automatically at nightfall and daybreak, such as those used to turn street lights on and off automatically.

DISABLING OF INSECTS

The disabling of insects in order to prevent them from escaping prior to being eaten by the fish is described above in the description of the operation of the device shown in FIG. 5. There, the insects are stunned or killed by heat and fall into the water where they are eaten.

FIG. 10 shows another method of disabling the insects - a method in which the insects also are chopped into bits or comminuted so as to make them suitable for feeding to minnows, goldfish, the young fry or fingerlings of food or sport fish such as trout, bass, catfish, carp, tilapia, etc.

The device used for communiting the insects is an insect trap such as the trap 204 shown in FIG. 8, with an additional motor 240 which drives a wheel 238 with thin wire spokes in a direction opposite to the direction of rotation of the fan 228. The counter-rotating wire spokes hit the insects and cut them into bits, thus providing food particles small enough for tiny fish to eat, as well as killing the insects so that they cannot escape from the water. See U.S. Pat. No. 3,123,933, for example, for further details of a typical insect comminution device.

The feed device shown in FIG. 10 also includes a ring-shaped float 242, and a plurality of spokes 244 supporting the insect trap and comminution device above the water. An enclosure to hold the insects is not needed because the dead insects cannot escape. The ring 242 holds the floating insect bits near the light.

Other means are known for killing or stunning insects. Electrocution devices are known, for example. These can be used instead of spinning wheel 238. Such devices leave the insects whole, which can be preferable to comminuting the insects.

INSECT HARVESTING

The efficient feeding of insects to land or aquatic animals requires efficient harvesting or gathering of the insects. An improved system and method for harvesting insects and feeding them to aquatic animals is shown in FIGS. 12 and 13 of the drawings.

FIGS. 12 and 13 show a plurality of insect traps 204 of the type shown in FIGS. 8 and 9 dispersed in a swamp area with tall grass 262. The insect traps are connected together in two groups of three traps each. The traps are connected together in series by means of a conduit 266 or 268 of relatively large diameter. The traps urge the insects they catch towards two fish cages 200 floating in an adjacent body of water 260 near one another. A generator 258 on the shore 264 supplies power to the traps 204.

The conduits 266, 268 and traps 204 which are on land are supported by posts 270, 272 driven into the ground so that the traps 204 are above the top of the vegetation 262, but the conduit 266 and 268 slopes toward the fish cages 200, as is shown in FIG. 13. The supports can be wheeled vehicles or floating to facilitate shifting the harvesting system to a new location.

FIG. 13 shows the internal components of the traps 204, which components have the same reference numerals as in FIGS. 8 and 9. The bottom openings of the traps 204 are connected by means of smooth curved sections 274 and 282 to the conduit 266 so that the downward thrust of the fans 228 in the traps will force air and insects through the conduit.

Check-valves 276 are provided adjacent the land-based traps 204 in order to prevent insects from escaping when the trap fans are turned off. One or more blowers 284 can be positioned in the conduit 266 to assist in moving the insects along the conduit. The check valves are thin metal or plastic disks pivoted at the bottom of the conduit and spring-biased to spring up when there is no air draft from a fan. The spring bias is relatively weak so that when the fan of an insect trap or blower is on, the check valves lie down close to the bottom of the conduit to allow air and insects to pass by. The vertical (closed) position of the valves is indicated by the dashed line 278 in FIG. 13.

It well may be that fish and other animals cannot keep up with the insect traps and feeding systems — they will continue to catch insects all night, while the animals can be expected to eat their fill and stop. In order to store insects for future use, a reservoir arrangement, is provided in the system of FIGS. 12 and 13. The reservoir is formed within and by the conduit 266 itself, together with a screen 286 and the check valves 276. The screen 288 is pivoted at the bottom of the conduit. Normally it lies along the bottom of the conduit, in the position shown in FIG. 13 in solid lines. A cord 288 is fastened to the top of the screen 286, passes through a small hole in the conduit wall, and is fastened to a pull ring 290. When it is desired to form the reservoir, the ring 290 is pulled to lift the screen 286 to its upright position indicated by a dashed line in FIG. 13. With the screen 286 up, the air goes through it, but the insects do not — they accumulate and are held in the resulting reservoir until needed.

It is preferred to transport the insects relatively slowly and to keep them alive, because they take much of the work out of transporting them when their ability to fly is left substantially unimpaired.

The system shown in FIGS. 12 and 13 need not be overly expensive because the conduit 266 and other components can be light-weight and inexpensive. The conduit can be plastic tubing, and the stress on it normally will not be great.

The system of FIG. 12 has an advantage in that the fish cages 200 can be much closer together than before - this saves space. Also, the cages can be bigger in volume and can support more fish.

LAND ANIMAL FEEDING

Insects are a known source of protein. They are relished not only by fish, but also by many fowl — chickens, ducks, turkeys, geese, etc. Also, it is believed taht other animals such as cattle, hogs, etc., will relish or eat insects, especially when the insects are mixed with food more familiar to the animals.

FIG. 15 shows an elongated chicken raising enclosure 316 with conduits 318 extending out from the enclosure and into swampy areas on both sides of the enclosure. An insect trap 204 is at the end of each conduit. There can be several traps 204 in series with each conduit, as shown in FIGS. 12 and 13, or a parallel branch conduit system as shown in FIG. 17 can be used if desired. In any event, the system of FIG. 15 has insect collection traps 204 distributed over the swampy land to gather insects and feed them into the enclosure.

FIG. 16 is a cross-sectional view of one conduit 318 and its trap 204. A blower 320 (marked by and "X" in FIG. 15) is located in each conduit, if needed. The conduit 318 passes through the wall of the enclosure 322. The inner end 324 of the conduit contains a fan to help urge the insects on, and a counter-rotating high-speed motor-driven spoked wheel as described above for comminuting the insects. Other means, such as electrocution means, can be used to kill the insects, if preferred. The insects then accumulate in a trough 330 where they are eaten by the chickens, or are mixed with other foods and fed to the chickens. Suitable electrocution grilles are sold, for example, by Insect-O-Cutor, Inc., Stone Mountain, Georgia, as parts of their insect electrocutiontype traps.

FIG. 17 shows a parallel-branch insect collection system with parallel-connected branch conduits 344, 346, 348 and 350 connected to central conduit 336. Each insect trap 204 and length of conduit is supported by a foam block 342 because, in this instance, the system floats on water. A collection barge 334 collects the comminuted insects in piles 340. A blower 320 and comminution device 326, 328 are provided in the end portion 338 of the conduit, as in FIG. 16.

The system of FIG. 17 is preferred when it is desired to collect insects at one point rather than at linearly distributed points as in FIGS. 12 and 15.

In many of the foregoing figures of the drawings, the electrical connections to the lamps and fans of the insect traps are not shown. However, the electrical wiring can be located along or within the insect conduits. Portable electrical generators or utility power supplies can be used.

TYPES OF AQUATIC ANIMALS

The types of fish believed to be capable of being fed by means of the invention include both freshwater and saltwater fish which are known to feed upon insects at the surface of the water in their natural habitat. Such fish include, for example, trout, salmon, bass, "panfish" such as crappie, sunfish, etc., and other fish considered to be game fish. Furthermore, it is expected that other types of fish, such as catfish and carp, and especially channel catfish, all of which are normally bottom-feeders, can be taught to rise to the surface to feed on insects.

The aquatic animals intended to be fed by means of the invention primarily constitute fish, but also can include such animals as turtles and others which feed on insects on the surface of the water.

FROG CULTURE

FIG. 14 shows the use of a cage 292 like that shown in FIGS. 8 and 9 in frog culture. The cage 292 has a frame 294 with fine mesh insect-restraining screen 296 on the top and sides. A larger mesh screen 300 is used on the bottom of the cage.

An insect trap 204 of the construction already disclosed above is mounted on a plywood panel 297 fastened to the frame 294. A pair of baffles 308 are mounted below the trap 204 to deflect insects to both sides of the cage.

The cage 292 is shallower than the fish cage of FIGS. 8 and 9, and also has a larger airspace above the water level 302. The cage is floated by means of foam blocks 304 and 306 which are secured to transverse frame members 312 and to one another. The blocks 304 extend to positions just below the water surface in the cage 292, and the blocks 306 extend just above the water surface. Thus, the blocks serve the dual purpose of providing resting platforms for frogs such as the frog 310, and also floating the cage on the water.

The reason for providing the baffles 308 and a larger airspace in the cage is that it is not necessarily desired to maximize contact of the insects with the water because the frogs have very efficient catching mechanisms for plucking the insects out of the air.

VARIATIONS

The insect trap devices can be converted for use in the daytime by using, instead of light, any of a number of known substances having an odor or appearance or other quality which attracts insects.

Although the usefulness of the invention in inland fish farms and hatcheries has been emphasized, it should be understood that it is not so limited. It is believed that the invention can be used to advantage in quiet salt water or brackish estuaries in which certian fish-raising areas have been fenced off, in both natural and artificial ponds or tanks, and in any body of water in which fish will rise to feed on the insects.

Some large fish may prefer eating smaller fish rather than insects. In such cases, the present invention can be used to raise the small fish (e.g., minnows, chubs or shiners) to be fed to the large fish. Alternatively, such small fish can be raised to be sold as bait fish to sports fisherman. Rough fish can be raised for used as fertilizer or other commercial products. In any such event, the invention is used to convert unused and previously useless insects into valuable food or commercial products.

The above description of the invention is intended to be illustrative and not limiting. Numerous variations or modifications other than those specifically described above may occur to those skilled in the art, and these can be made without departing from the spirit or scope of the invention.

I claim:

1. A device for feeding aquatic animals in a body of water, said device comprising, in combination, insect retention means including a canopy structure, support means for supporting said canopy structure above the surface of said water, said canopy structure defining an enclosed peripheral area of substantial size with said canopy structure covering said area for preventing insects from escaping from the vicinity of the surface of said body of water below the canopy, insect attraction means supported by said support means with said canopy means so as to attract insects towards said area covered by said canopy structure, and insect directional means supported by said support means with said attraction means for directing insects towards said covered area.

2. A device as in claim 1 in which said directional means comprises a guide structure having an inlet opening and an outlet opening of substantially smaller size than said inlet opening, said guide structure being supported with said inlet opening facing upwardly and said outlet opening facing downwardly into the area covered by said canopy structure.

3. A device as in claim 2 in which said attraction means comprises a lamp, and including means for supporting said lamp above said outlet opening.

4. A device as in claim 3 in which said directional means includes a fan supported with said lamp for urging insects downwardly through said guide structure and into the area covered by said canopy structure.

5. A device as in claim 1 in which said retention means includes means for comminuting said insects.

6. A device as in claim 1 in which said attraction means includes lamp means for emitting light energy attractive to said insects.

7. A device as in claim 6 in which said lamp means is a blacklight emitting predominantly ultra-violet radiation.

8. A device as in claim 6 in which said lamp means is a fuel-burning lamp.

9. A device as in claim 1 including fan means mounted on said support means for creating an air draft to urge insects towards said water.

10. A device as in claim 1 in which said support means includes buoyant means secured to said canopy means for floating said device on said surface of said water.

11. A device as in claim 10 in which said buoyant means has a central opening providing free access to the water surface within said opening, said canopy structure forming a cover over said central opening to form an insect cage adjacent said surface, said covering having at least one restricted access hole to permit the entrance of said attracted insects.

12. A device as in claim 11 including a lamp and a fan mounted over said access hole, with said fan being positioned to blow the attracted insects through said access hole.

13. A device as in claim 11 including means for heating the interior of the enclosure formed by said buoyant means and said cover so as to kill or stun the insects and cause them to drop into the water.

14. A device as in claim 11 including a fan under said cover and an egress hole closely adjacent the water to allow insects to float out of said device.

15. A device as in claim 1 in which said attracting means comprises means for directing light radiation into said water.

16. A device as in claim 15 in which said light radiation is blacklight.

17. A device as in claim 16 including an elongated blacklight radiating member, and including means for mounting said radiating member substantially parallel to the surface of said water.

18. A device as in claim 15 inlcuding a cage secured to and extending beneath said support means for containing said animals in said water adjacent said source to eat the insects attracted towards said source.

19. A device as in claim 15 in which said radiating member is a circular fluorescent blacklight bulb.

20. A device as in claim 1 including a cage secured to and extending below said canopy structure to contain aquatic animals below said canopy.

21. A device as in claim 20 in which said aquatic animals are fish and said cage is secured at the periphery of said canopy structure.

22. A device for feeding aquatic animals in a body of water, said device comprising, in combination, a float means, an insect directional means supported by the float means and positioned substantially centrally thereof and elevated with respect thereto, attraction means supported with the directional means, and retention means including a canopy structure connected with the float means and the directional means and defining an enclosed peripheral area of substantial size, with said canopy structure covering said enclosed peripheral area for preventing insects from escaping from the vicinity of the surface of said water.

* * * * *